(12) United States Patent
Nightengale et al.

(10) Patent No.: US 8,380,569 B2
(45) Date of Patent: Feb. 19, 2013

(54) METHOD AND SYSTEM FOR ADVANCED WARNING ALERTS USING ADVANCED IDENTIFICATION SYSTEM FOR IDENTIFYING FRAUD DETECTION AND REPORTING

(75) Inventors: Brad Nightengale, Redwood Shores, CA (US); Sharon Rowberry, San Mateo, CA (US)

(73) Assignee: Visa International Service Association, Inc., San Francisco, CA (US)

(*) Notice: Subject to any disclaimer, the term of this patent is extended or adjusted under 35 U.S.C. 154(b) by 272 days.

(21) Appl. No.: 12/505,812

(22) Filed: Jul. 20, 2009

(65) Prior Publication Data

US 2010/0268696 A1 Oct. 21, 2010

Related U.S. Application Data

(60) Provisional application No. 61/169,947, filed on Apr. 16, 2009.

(51) Int. Cl.
*G06Q 30/00* (2006.01)
*G06F 17/30* (2006.01)

(52) U.S. Cl. .......... 705/14.26; 705/14.47; 705/14.53; 705/14.56; 705/14.66; 707/769; 707/784

(58) Field of Classification Search .......... 707/694, 707/702, 703, 758, 768–769, 783–784; 705/14.25–14.26, 14.47, 14.53, 14.56, 14.66
See application file for complete search history.

(56) References Cited

U.S. PATENT DOCUMENTS

| | | | |
|---|---|---|---|
| 5,530,438 A | 6/1996 | Bickham et al. | |
| 5,615,110 A | 3/1997 | Wong | |
| 5,774,882 A | 6/1998 | Keen et al. | |
| 5,878,337 A | 3/1999 | Joao et al. | |
| 5,903,830 A | 5/1999 | Joao et al. | |
| 6,055,570 A | 4/2000 | Nielsen | |
| 6,064,990 A | 5/2000 | Goldsmith | |
| 6,088,686 A | 7/2000 | Walker et al. | |
| 6,119,103 A | 9/2000 | Basch et al. | |
| 6,173,284 B1 * | 1/2001 | Brown .......... | 707/702 |
| 6,311,169 B2 | 10/2001 | Duhon | |

(Continued)

FOREIGN PATENT DOCUMENTS

| | | |
|---|---|---|
| EP | 1975869 | * 10/2008 |
| WO | WO 94/23528 | * 10/1994 |

(Continued)

OTHER PUBLICATIONS

Ranjit Bose, "Intelligent Technologies for Managing Fraud and Identity Theft",Proceedings of the Third International Conference on Information Technology: New Generations (ITNG'06), Apr. 2006, 6 pages.*

(Continued)

*Primary Examiner* — Srirama Channavajjala
(74) *Attorney, Agent, or Firm* — Kilpatrick Townsend & Stockton LLP (57) ABSTRACT

The present invention is directed to a system, method and server to assist account issuers in managing risk, fraud and unauthorized use. A system, method and server for use in pushing advanced warning alerts to issuers based on consumer data element level triggering events and fraud and unauthorized use reports is disclosed. The ability to the push the alerts to issuers with a permissible purpose for receiving the information in the alerts provides a real-time, online and cost effective way of providing issuers with valuable risk management tools.

8 Claims, 8 Drawing Sheets

U.S. PATENT DOCUMENTS

| | | | |
|---|---|---|---|
| 6,330,546 B1 | 12/2001 | Gopinathan et al. | |
| 6,418,436 B1 | 7/2002 | Degen et al. | |
| 6,529,725 B1 | 3/2003 | Joao et al. | |
| 6,553,100 B1 | 4/2003 | Chen et al. | |
| 6,658,393 B1* | 12/2003 | Basch et al. | 705/38 |
| 6,842,774 B1 | 1/2005 | Piccioni | |
| 6,873,972 B1 | 3/2005 | Marcial et al. | |
| 6,891,811 B1 | 5/2005 | Smith et al. | |
| 6,985,901 B1* | 1/2006 | Sachse et al. | 1/1 |
| 7,028,052 B2 | 4/2006 | Chapman et al. | |
| 7,096,003 B2 | 8/2006 | Joao et al. | |
| 7,100,049 B2 | 8/2006 | Gasparini et al. | |
| 7,315,863 B2* | 1/2008 | Kambo et al. | 719/318 |
| 7,337,119 B1 | 2/2008 | Geschwender et al. | |
| 7,355,990 B2 | 4/2008 | Smith et al. | |
| 7,356,506 B2 | 4/2008 | Watson et al. | |
| 7,357,310 B2 | 4/2008 | Calabrese et al. | |
| 7,546,271 B1* | 6/2009 | Chmielewski et al. | 705/38 |
| 8,165,945 B2* | 4/2012 | Collins et al. | 705/35 |
| 2001/0011245 A1 | 8/2001 | Duhon | |
| 2001/0029485 A1 | 10/2001 | Brody et al. | |
| 2002/0077964 A1 | 6/2002 | Brody et al. | |
| 2002/0087460 A1 | 7/2002 | Hornung | |
| 2002/0116322 A1 | 8/2002 | Schnall | |
| 2002/0133462 A1 | 9/2002 | Shteyn | |
| 2002/0138409 A1* | 9/2002 | Bass | 705/38 |
| 2003/0182214 A1* | 9/2003 | Taylor | 705/35 |
| 2004/0064401 A1 | 4/2004 | Palaghita et al. | |
| 2004/0103049 A1 | 5/2004 | Kerr | |
| 2004/0139010 A1* | 7/2004 | McMichael et al. | 705/40 |
| 2004/0245330 A1 | 12/2004 | Swift et al. | |
| 2005/0097051 A1* | 5/2005 | Madill et al. | 705/50 |
| 2005/0160280 A1* | 7/2005 | Caslin et al. | 713/189 |
| 2006/0026102 A1* | 2/2006 | Ryan, Jr. | 705/50 |
| 2006/0089905 A1 | 4/2006 | Song et al. | |
| 2006/0200396 A1 | 9/2006 | Satterfield et al. | |
| 2007/0005416 A1* | 1/2007 | Jackson et al. | 705/14 |
| 2007/0006286 A1 | 1/2007 | Singhal | |
| 2007/0106580 A1* | 5/2007 | Yang et al. | 705/35 |
| 2007/0203826 A1 | 8/2007 | Thomas et al. | |
| 2007/0204033 A1* | 8/2007 | Bookbinder et al. | 709/224 |
| 2007/0214085 A1* | 9/2007 | Degen et al. | 705/44 |
| 2008/0156869 A1 | 7/2008 | Carr et al. | |
| 2008/0288382 A1* | 11/2008 | Smith et al. | 705/35 |
| 2008/0288385 A1* | 11/2008 | Geschwender et al. | 705/35 |
| 2009/0089190 A1* | 4/2009 | Girulat, Jr. | 705/30 |
| 2009/0106846 A1 | 4/2009 | Dupray | |
| 2010/0070479 A1* | 3/2010 | Maitino et al. | 707/702 |
| 2010/0241558 A1* | 9/2010 | Chmielewski et al. | 705/38 |

FOREIGN PATENT DOCUMENTS

| | | | |
|---|---|---|---|
| WO | WO 2007/001394 | * | 1/2007 |
| WO | WO 2007028048 | * | 3/2007 |

OTHER PUBLICATIONS

Pallapa Venkataram et al. "A Method of Fraud & Intrusion Detection for E-payment Systems in Mobile e-Commerce", 2007, IEEE, pp. 395-401.*

U.S. Appl. No. 10/850,975, filed May 21, 2004.

International Search Report for Application No. PCT/US2010/031240, dated Nov. 30, 2010, 5 pages.

International Written Opinion for Application No. PCT/US2010/031240, dated Nov. 30, 2010, 4 pages.

* cited by examiner

Figure 1A

PRIOR ART

METHOD AND SYSTEM FOR ADVANCED WARNING ALERTS USING ADVANCED IDENTIFICATION SYSTEM FOR IDENTIFYING FRAUD DETECTION AND REPORTING

CROSS-REFERENCES TO RELATED APPLICATIONS

This Application claims priority to U.S. Provisional Patent Application No. 61/169,947 filed on Apr. 16, 2009, and is herein incorporated by reference in its entirety for all purposes.

BACKGROUND

With increased losses in a recession economy, issuers need faster, better account management tools to control risk. Current account and risk management tools for issuing financial institutions (issuer) do not allow them to receive unsolicited data or other data automatically that could indicate an account or an account holder may have become risky in an online real-time process using data submitted by other issuers. As of yet, there is no simple way for issuers to share fraud data, unauthorized use data and application velocity data at a consumer level in real time.

In an attempt to deliver timely alerts to their member account issuers, some transaction processors offer risk management tools for prevention, detection and resolution of fraud and credit risks including application screening and fraud detection (AFSD) services for new accounts and other tools for detecting fraud and risk on existing accounts. Alerts are used to inform member account issuers of conditions during the application and approval process and conditions that arise after an application is processed, approved, an account is opened and, in the case of credit cards, a card is issued. Alerts delivered after an account is open "retroactively" can provide "new" more recent information that might be relevant to the identifying increased risk during the life of an account. For example, one member account issuer might like to know when one of their consumers has taken various actions such as applying for an account with another member account issuer.

When an account issuer processes an application for an account, it collects information from the consumer applying for the account. In the case of a credit card account application, the issuer typically collects the consumer's name, address, Social Security number, telephone number and other information that can be used for identifying the consumer.

To aid in its decision as to whether to open the account, the issuer will conduct research to determine whether the consumer qualifies under its own internal qualification and risk management policies, systems and protocols. Various issuers will have various requirements for opening an account. For example, a credit card issuer may require the consumer has fewer than X number of other credit card accounts and no convictions of fraud, whereas an online retail site might only require that a consumer have no more than one account with that retailer.

To aid in an account issuer's research to determine whether a particular consumer is account worthy, various consumer-reporting entities provide a multitude of consumer reporting services. For credit card issuers, there are several consumer credit reporting bureaus such Equifax® and Experian® that provide lenders with access to consumer reports that include the status of all tradeline accounts reported into that bureau for that particular consumer under investigation. Consumer credit reporting bureaus can also compute and report an overall credit score for the consumer. The information consumer credit reporting bureaus have combines all individual account level data, such as the age of the account, payment history, the amount of credit and the amount and age of the outstanding balances for a particular consumer. To provide incremental information above what is available through the consumer credit reporting agencies, various transaction processing associations and other organizations have developed numerous services to collect and deliver supplemental risk data to lenders opening accounts including credit card account issuers.

Currently, consumer and other risk data is collected by various data sharing consortiums. Typically, each consortium specializes in solving a particular problem. In the credit card industry, risk products and services are provided by transaction processing associations such as Visa with its Issuers' Clearinghouse Services (ICS). When an account issuer receives the application for a new account from a consumer, the account issuer submits consumer level information along with an application identifier and account issuer entity identifier, such as a bank identification number or BIN. Typical consumer data elements can include, but are not limited to, name, address, phone number, Social Security number (SSN) and birth date.

Every application reported into an ASFD services server receives a response based on the consumer data elements submitted with the application. The response is a confirmation, an alert or invalid. An alert returns information back to the account issuer that submitted the application advising it of any suspicious characteristics or activities as defined by the account issuer. This flexibility is provided to allow issuers to define the types of information they need based on differences in customer prospects, credit card portfolios and risk management protocols. For example, credit card issuers will submit a credit card application with all of the consumers particular consumer data elements, an application identification code and a bank identification number and expect to receive a report regarding the authenticity of the consumer data elements and any reports of fraud or unauthorized use involving those consumer data elements reported by other credit account issuers but they may not want to be advised when a card is lost or stolen or they may want only fraud reported and no application activity.

In addition, all risk service servers collect and store application data for some period of time in order to report historical activity on individual consumer data elements. For example, an ASFD server 140 can keep track of the number of times a particular name or Social Security number is submitted in various credit card applications from multiple issuers. Currently, many ASFD servers can report to issuers whenever it detects a consumer data element level triggering event or consumer data element application velocity threshold.

Consumer data element level triggering events can vary depending on the needs of the account issuer. Some issuers, for example, will want to know the application velocity for a particular Social Security number. That is, the issuer will want to know the rate at which the Social Security number shows up in applications submitted within some defined period of time. As an example, issuer A may wish to be alerted whenever Social Security number XXX-XX-XYZX is observed in 3 credit applications in less than 30 days. The threshold Social Security number velocity therefore is 3 applications per 30 days.

If a triggering event is observed by the ASFD server, current services provide protocols for sending retroactive alerts to the issuers that requested the alerts and defined the triggering event. However, for the ASFD server to send a credit issuer more information than a notification that a triggering event has been observed, the operator of the ASFD server must first verify that a credit issuer has a permissible purpose under the Fair Credit Reporting Act (FCRA).

Permissible purpose is defined in Section 604 of the Fair Credit Reporting Act (FCRA), 25 U.S.C. §1681b. Under FCRA, a credit issuer cannot obtain a consumer report unless they have a permissible purpose to receive a consumer report.

As define under 35 U.S.C. §1681b, permissible purposes for receiving consumer reports are:

(a) In general, subject to subsection (c), any consumer reporting agency may furnish a consumer report under the following circumstances and no other:

(1) In response to the order of a court having jurisdiction to issue such an order, or a subpoena issued in connection with proceedings before a Federal grand jury.

(2) In accordance with the written instructions of the consumer to whom it relates.

(3) To a person which it has reason to believe (A) intends to use the information in connection with a credit transaction involving the consumer on whom the information is to be furnished and involving the extension of credit to, or review or collection of an account of, the consumer; or (B) intends to use the information for employment purposes; or (C) intends to use the information in connection with the underwriting of insurance involving the consumer; or (D) intends to use the information in connection with a determination of the consumer's eligibility for a license or other benefit granted by a governmental instrumentality required by law to consider an applicant's financial responsibility or status; or Jul. 30, 2004 13

(E) intends to use the information, as a potential investor or servicer, or current insurer, in connection with a valuation of, or an assessment of the credit or prepayment risks associated with, an existing credit obligation; or (F) otherwise has a legitimate business need for the information (i) in connection with a business transaction that is initiated by the consumer; or (ii) to review an account to determine whether the consumer continues to meet the terms of the account.

(4) In response to a request by the head of a State or local child support enforcement agency (or a State or local government official authorized by the head of such an agency), if the person making the request certifies to the consumer reporting agency that (A) the consumer report is needed for the purpose of establishing an individual's capacity to make child support payments or determining the appropriate level of such payments;

(B) the paternity of the consumer for the child to which the obligation relates has been established or acknowledged by the consumer in accordance with State laws under which the obligation arises (if required by those laws);

(C) the person has provided at least 10 days' prior notice to the consumer whose report is requested, by certified or registered mail to the last known address of the consumer, that the report will be requested; and (D) the consumer report will be kept confidential, will be used solely for a purpose described in subparagraph (A), and will not be used in connection with any other civil, administrative or criminal proceeding, or for any other purpose.

(5) To an agency administering a State plan under Section 454 of the Social Security Act (42 U.S.C. §654) for use to set an initial or modified child support award.

ASFD servers and databases do not receive information from issuers as to whether an application was approved and if an account was opened nor do they receive periodic updates from issuers reporting applications into the database about the status of an account, payment history etc. Therefore, it is unknown if a particular issuer meets the requirements of the FCRA and subsequently if they can receive updated information related to the original applicant. To obtain such information, issuers must validate that they have permissible purpose before any retroactive alerts can be delivered to them. This process involves five steps two transactions and delays the receipt of risk information.

When a triggering event is observed by the ASFD server, the ASFD server sends a retroactive alert to one or more credit issuers as the first transaction. The retroactive alert as initially sent to the credit issuers contains no other information other than one of that credit issuers' triggering events has been observed.

Figure 1A:
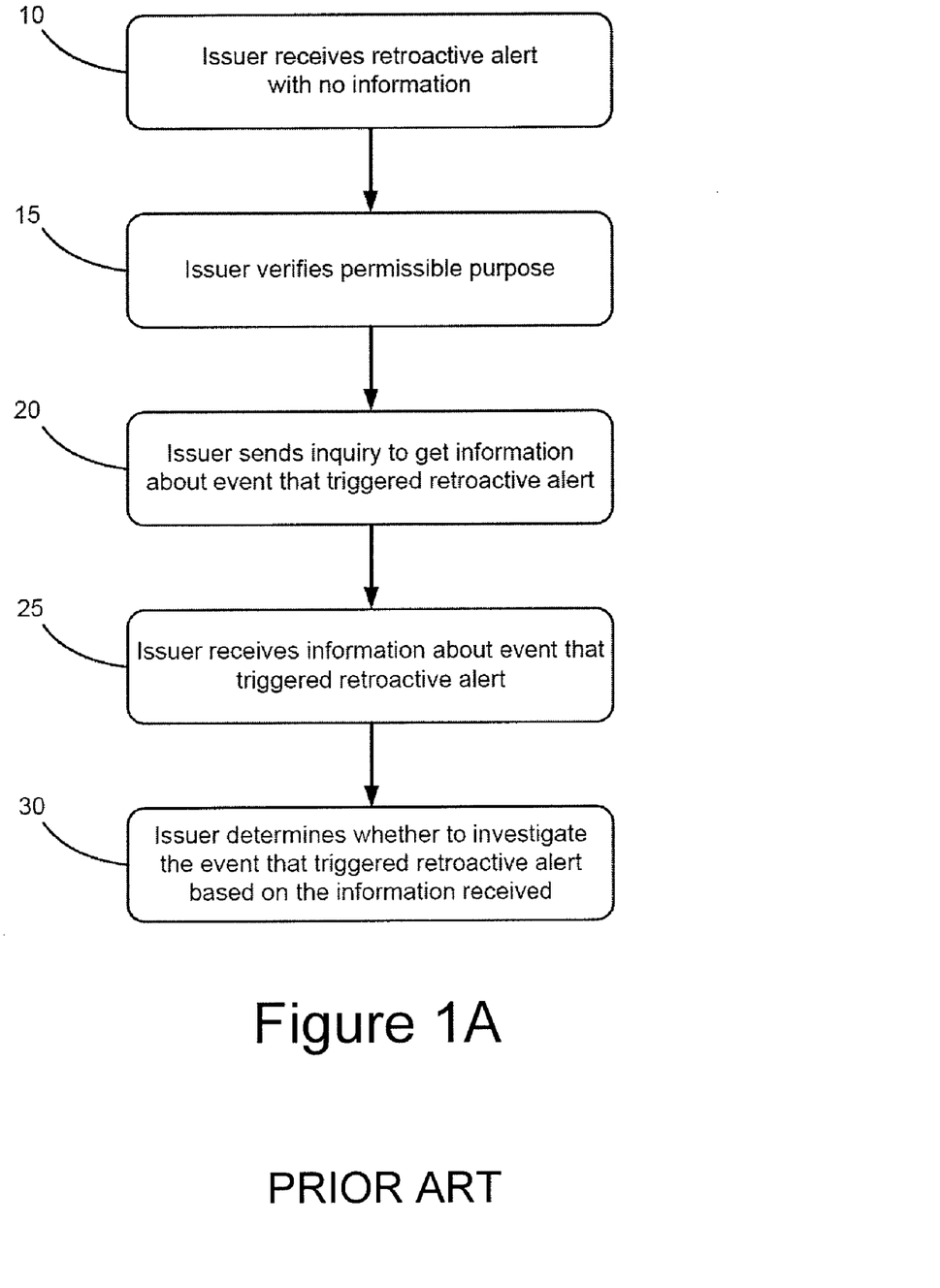
FIG. 1A depicts a flow chart of the current three-transaction process used to deliver information regarding the events that trigger a retroactive alert.

FIG. 1A is a flow chart of a current retroactive alert process from the perspective of a credit issuer. Once the retroactive alert with limited information is sent by the ASFD server, the issuer receives the retroactive alert via existing or other communication channels in step 10. In step 15, after determining that it wants to take further action, the issuer verifies to the ASFD server it has permissible purpose under FCRP. This is typically achieved in a second transaction wherein the credit issuer sends an account number with a corresponding application identifier and BIN to the ASFD server to confirm that the credit issuer did in fact open a credit account based on an application it previously submitted to the ASFD server.

Once the issuer verifies it has a permissible purpose for the information that triggered the event, the issuer sends a second transaction, or inquiry transaction, to the ASFD server to request additional information regarding the events that triggered the retroactive alert in step 20. As shown in FIG. 1A, after receiving the alert, the process of getting information regarding the triggering event involves two transactions between steps 10, 15, 20 and finally step 25 in which the issuer receives information about the event that triggered the retroactive alert. Under FCRA regulations, the ASFD server can only send specific information about the account activity for the account issued by the issuer. No information about the activity of accounts not owned by the particular issuer is ever delivered, the ASFD server can only send generalities and nonspecific descriptions of the events.

Finally, in step 30, the issuer can determine whether to investigate the events that triggered the retroactive alert using information received from the ASFD server. A typical issuer response would be to contact the consumer involved to investigate the behavior or the events that triggered the alert or to change the behavioral model or decision tree associated with that particular consumer. In any event, the two-transaction process involved in sending an issuer information regarding the behavior or events that triggered the retroactive alert can be slow and expensive.

Embodiments of the present invention address these and other problems and deficiencies.

BRIEF SUMMARY

One embodiment of the present invention is an advance identification system having an application screening and fraud detection module, a consumer database and a matching and alert module configured to query one or more reporting entities for one or more account numbers and to link the one or more account numbers to a plurality of consumer data elements in the consumer database. The matching and alert module is configured to monitor applications submitted to the application screening and fraud detection module and the consumer database for a variety of consumer data element level triggering events such as threshold consumer data element velocities and reports of fraud and unauthorized use. The plurality of consumer data element level triggering events can be set by one or more requesting entities or recommended by the advanced identification system.

In some embodiments, the requesting entities are account issuers and the matching and alert module is further configured to push an alert to the issuers determined to have a permissible purpose under the rules and regulations of the Fair Credit Reporting Act. Permissible purpose can be presumed when an external reporting entity can verify that an account has been opened and is still opened in response to an account number received by the advanced identification system.

Another embodiment of the present invention is a method of pushing advance warning alerts using the advanced identification system. The method includes receiving an application comprising a number of consumer data elements, an application identification element and a requesting entity identifier at an application screening and fraud detection server linked to a matching and alert server in the advanced identification system. The matching and alert server then sends a query to one or more reporting entities, such as credit reporting bureaus, for an account identifier corresponding to the previously received application. In response to the query, the matching and alert server receives a number of potentially associated account identifiers, or account numbers, and then links the plurality of consumer data elements to one or more account identifiers corresponding to previously received applications. The matching and alert server then continuously monitors subsequent incoming applications for one or more consumer data element level triggering events. When a triggering event is detected, the matching and alert server pushes an alert message to the requesting or subscribed entity identified by the account identifier.

In one embodiment, the triggering events are set by the requesting entity and in other embodiments, the triggering events are recommended by the operator of the advanced identification system or another entity. In some embodiments, the triggering event is a combination of consumer data element level triggering events and fraud and unauthorized use reports or other indicators of fraud or credit risk.

In another embodiment, an advanced identification server comprising an application screening and fraud detection server is configured to receive a plurality of applications each comprising an application identification element, a plurality of consumer data elements and a issuer identifier and a matching and alert server connected to the application screening and fraud detection server and configured to query one or more reporting entities for account numbers corresponding to each of the plurality of applications. The matching and alert server is configured to link the account numbers corresponding to each of the plurality of applications to the plurality of consumer data elements in each of the plurality of applications and monitor subsequent applications for one or more consumer data element level triggering events. The matching and alert server can also push an alert to one or more issuers identified by the issuer identifier in one or more of the plurality of applications when the one or more consumer data element level triggering events is detected. In some embodiments, the alert includes a detailed description of the triggering events. In other embodiments, the triggering events can be a combination of consumer data element velocity thresholds and fraud and unauthorized use reports.

DETAILED DESCRIPTION

Embodiments of the present invention provide for easier, faster and cost-effective systems and methods for delivering real-time, online, advanced warning alerts to account issuers. Although embodiments of the present invention can be used to reduce or manage the risk associated with the issuance of any type of account, some of the examples set forth below will be in the context of credit card applications and credit card issuers. These examples should not be viewed as limiting the present invention as being directed to pushing advanced warning alerts only to credit card issuers. On the contrary, the systems and methods described in the description and examples that follow can be used to manage the risk associated with issuing accounts such as online retail accounts, checking and savings accounts, brokerage accounts, reward program accounts and other accounts susceptible to misuse, unauthorized use and fraud.

Figure 1B:
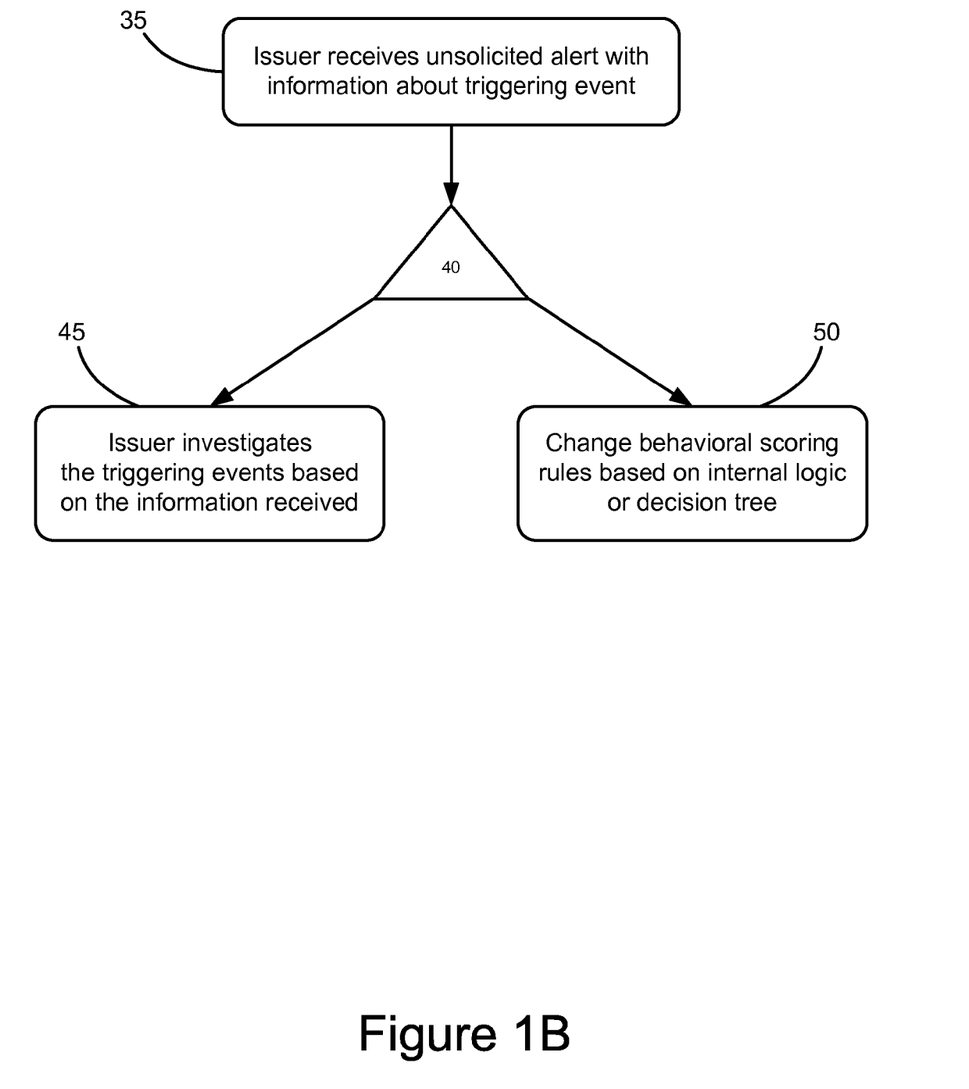
FIG. 1B depicts a flow chart of the one-transaction process used to deliver information regarding the events that trigger advance warning alerts according to one embodiment of the present invention.

FIG. 1B depicts a flow chart of the simplified advanced warning alert process from the perspective of an issuer according to one embodiment of the present invention. In contrast to the process depicted in FIG. 1A, after the triggering events are defined by either an application screening and fraud detection (ASFD) server or the issuer, the issuer will simply receive unsolicited alerts with all permissible information regarding the triggering event in step 35. Once the information about the triggering event is received, the issuer can decide which course of action to take. Depending on the information it receives, the issuer has to decide in step 40 either to investigate the triggering events in step 45 or to change the behavioral scoring rules based on its own logic or decision tree of its internal risk management programs and protocols in step 50. When compared to the flowchart in FIG.

1A, it is clear that the number of transactions required to fully inform an issuer about the triggering event is reduced from three to one. Instead of receiving the alert, sending a permissible purpose verification message and then sending an inquiry message, the only transaction is the alert sent by a matching and alert server or the ASFD server to the issuer. This reduction in transactions reduces not only the time it takes to get information to the issuer; it also reduces the amount of labor and cost involved.

Advanced Warning System

Figure 2:
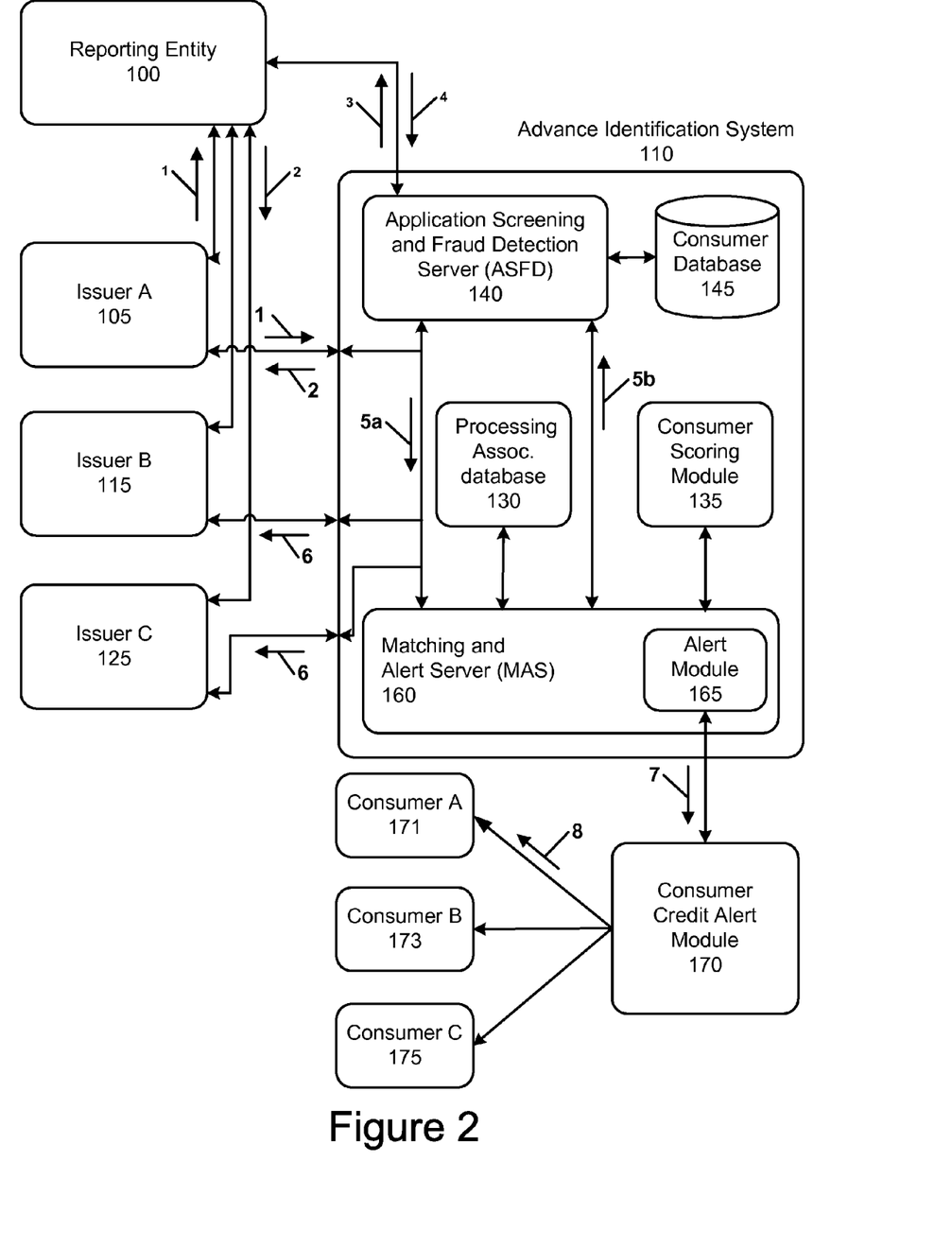
FIG. 2 is a block diagram of a system for delivering advanced warning alerts according to one embodiment of the present invention.

FIG. 2 depicts a schematic of a system for pushing advanced warning alerts to account issuers according to one embodiment of the present invention. FIG. 2 also includes a flow diagram of the serial and parallel steps of a method for pushing advanced warning alerts of potential risks to account issuers according to one embodiment of the present invention.

In some embodiments, advanced identification system (AIS) 110 can include a variety of modules. Although the number and types of modules included in AIS 110 can vary or be incorporated into fewer or expanded into more modules, one of ordinary skill in the art recognize the scope of the present invention is defined by the functionality described and not necessarily by the discrete modules the context in which the present invention is described.

For example, in one embodiment, AIS 110 can include an application screening and fraud detection (ASFD) server 140, a consumer database 145, a matching and alert server (MAS) 160 as well as other modules such as processing association database 130 and consumer scoring module 135. Each of the discrete modules in AIS 110 can be operated entirely by one entity or alternatively, multiple entities can operate one or more of the discrete modules in AIS 110 in cooperation or by contract to produce the same functionality. One entity may own and operate AIS 110 by contracting with third-party vendors to supply the services or functionality of the various modules depicted in FIG. 2. As used herein, the terms ASFD server 140 and ASFD 140 can be used interchangeably and can describe a server computer comprising one or more computer systems networked so as to be in communication with various other modules of AIS 110. The functionality of the various modules in AIS 110 can be performed by one or computer systems configured to execute computer readable code stored in one or more forms of computer readable media or received in a communication signal.

One example of an arrangement in which some or all of the individual modules of AIS 110 are provided by separate third-party vendors can include a first entity, a second entity, and a third entity. The first entity can own and operate the matching and alert server (MAS) 160, the second entity can own and operate ASFD 140 and consumer database 145, while the third entity can own and operate processing association database 130 and consumer scoring module 135. In such an arrangement, it is contemplated that the first entity that owns and operates MAS 160 is the same entity that arranges and manages AIS 110.

AIS 110 can be configured to communicate with outside entities and to deliver information received from outside entities to each of the individual modules. Examples of possible outside entities include reporting entity 100, issuer A 105, issuer B 115 and issuer C 125. In alternative embodiments of the present invention, AIS 110 can communicate with consumer credit alert module 170, which in turn, can broadcast information and alerts to consumers such as consumer A 171, consumer B 173 and consumer C 175.

When the individual modules of AIS 110 are owned and operated by separate entities, the software or hardware connections between each module can be standardized to facilitate reliable, consistent and secure communication between the modules. In various embodiments, the connections amongst individual modules within AIS 110 and external entities can take place over existing communication channels. Various embodiments can utilize the system architecture depicted in FIG. 2.

In one embodiment, one or more issuers submit account applications to both ASFD 140 and reporting entity 100 using the connections between each of the issuers and reporting entity 100 and ASFD 140 along the path indicated by step 1. The account applications can include consumer data, an application identifier and an entity identifier. The use and function of the account application elements are described in more detail below in the context of various steps of the methods according to various embodiments of the present invention.

Application Process

To help illustrate the steps and functionality of the various modules involved in a typical application process, numbered arrows indicating transactions between various modules are included in the system schematic of FIG. 2. The system depicted in FIG. 2 shows various communication connections and pathways to facilitate internal communication of AIS 110 and external communication between AIS 110, the issuers and the outside reporting entity 100. The specific connections shown in FIG. 2 are not limiting. One of ordinary skill in the art will recognize that many variations of the connections shown in FIG. 2 exist and can be achieved with a variety of connections and networks including, but not limited to, distributed networks, proprietary networks, the Internet and wireless networks.

The application process begins when an issuer, such as issuer A 105, receives an application for an account from a consumer. The issuer decides if the consumer meets its internal qualification standards and is worth the risk involved in issuing a new account to the consumer. To aid in such decisions, issuer A 105 can send the consumer's application with requests for information to both reporting entity 100 and AIS 110 as indicated by step 1. In some embodiments, ASFD 140 will receive the application and the request for information from issuer A 105 on behalf of AIS 110.

As previously mentioned, the application can include an application identifier an issuer identifier and consumer data such as name, address, telephone number, SSN and other identifying consumer data elements. In step 2, reporting entity 100 can then report back to issuer A the status of all accounts, such as credit card accounts, owned by the consumer identified in the application. Meanwhile, in a parallel or serial step 2, ASFD 140 can report back information from consumer database 145 to help issuer A 105 reduce application and identity fraud and credit losses, such as whether any of the consumer data reported on the application shows suspicious activity or has been reported as being involved with fraud.

Once issuer A 105 receives reports from reporting entity 100 and AIS 110, it can use the information to make its decision as to whether to grant a new account in response to the consumer's account application. It is currently common practice for issuers to report any newly opened accounts to reporting entity 100. However, it is neither common practice nor required for the issuers to report when a new account is opened based on an application previously submitted to AIS 110 or ASFD 140. Embodiments of the present invention make up for some the deficiencies and information gaps resulting from the lack of reporting new accounts to AIS 110 or ASFD 140.

At step 3 in FIG. 2, AIS 110 or ASFD 140 can send an information request to reporting entity 100 to determine if an account was opened based on an application previously received by AIS 110 or ASFD 140. The information request can include information from one or more previously received account applications. For example, the information request can include the application identifier, the account issuer identifier and all or some of the consumer data elements. Information requests to reporting entity 100 can include information from many account applications received by AIS 110 or ASFD 140. In such embodiments, a plurality of received applications can be processed in batches. The batch processing allows reporting entity to return responses to information requests in batches as well.

In response to the information request, reporting entity 100 can return a response in step 4. Response to information request from AIS 110 or ASFD 140 of step 3 can include an application identifier, issuer identifier and account identifier (account number) along with any or all of the consumer data elements submitted in the initial information request. If no account number is returned in response to an information request regarding a particular application, AIS 110 or ASFD 140 can assume that no account was opened based on that particular application. However, if the response does include an account number for a particular application, then ASFD 140 or MAS 160 can compare the application identifier, the issuer identifier and the consumer data elements to the information in the previously received application to determine whether that account was opened in response to the application. For example, if the response includes a matching application identifier and issuer identifier with sufficient matching consumer data elements, ASFD 140 can assume that account was opened based on the previously received application. ASFD 140 can then submit and store the newly acquired account information in consumer database 145 and MAS 160 can match or link the account identifier to the individual consumer data elements in the previously received application.

In embodiments in which MAS 160 links the data received from the external reporting entity 100 and consumer data elements in the previously received application, information received from reporting entity 100 can be shared with AFSD 140 in steps 5Aa and 5b. Either ASFD 140 or MAS 160 in step 5b can link the account information received from reporting entity 100 to consumer data elements in consumer database 145. For example, the account information can include an account number for consumer A 171. The account number can then be linked individually to the name, address, SSN, telephone numbers and birth date of consumer A 171. That is, the account number can be linked to the name of consumer A 171 and SSN of consumer A 171 independent of the other link.

In some embodiments, as new account applications come into AIS 110, ASFD 140 or MAS 160 can continuously update consumer database 145 with account information from reporting entity 100 regarding accounts that may have been opened based on new account applications. Similarly, MAS 160 can continuously update the links of account information with the consumer data elements stored in consumer database 145. Based on this continuously updated information linking account level information with consumer data element information, MAS 160 is in an ideal position to monitor incoming application data at the consumer data elements level.

Once MAS 160 has determined an account has been opened based on a previously received application, MAS 160 can assume that the issuer who submitted the application and subsequently opened the account has permissible purpose to receive information not only about that account but also about the consumer listed on the account and identified by the consumer data elements.

At an issuer's request, MAS 160 can monitor applications received by AIS 110 and ASFD 140. MAS 160 can monitor the rate at which consumer data elements are received in applications submitted by one or more issuers. As used herein, the rates at which consumer data elements or applications are detected are referred to as consumer data element velocity and application velocity.

Consumer data element velocity can refer to the number of times a particular consumer data element is detected in multiple account applications over a period of time. For example, a normal SSN velocity may be defined as the SSN showing up in three applications in any six-month period. In contrast, however, an abnormal SSN velocity may manifest as an SSN appearing in eight for more applications within a 30-day period. A threshold SSN velocity can be defined somewhere in between the normal and the abnormal SSN velocities. The threshold velocity can define the event that triggers an alert.

Figure 5A:
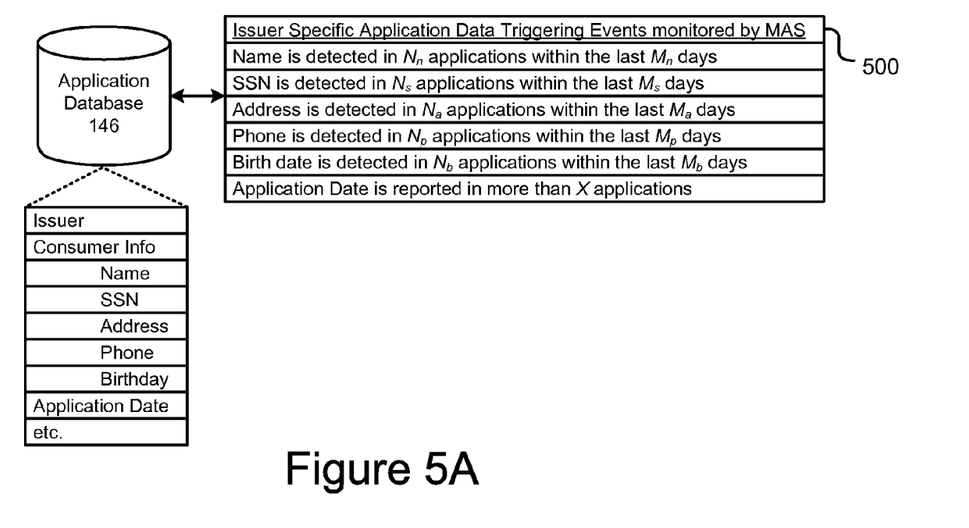
FIGS. 5A and 5B list sample definitions of events that may be used by a matching and alert server to trigger an advanced warning alert being sent to an issuer according to one embodiment of the present invention.
Figure 5B:
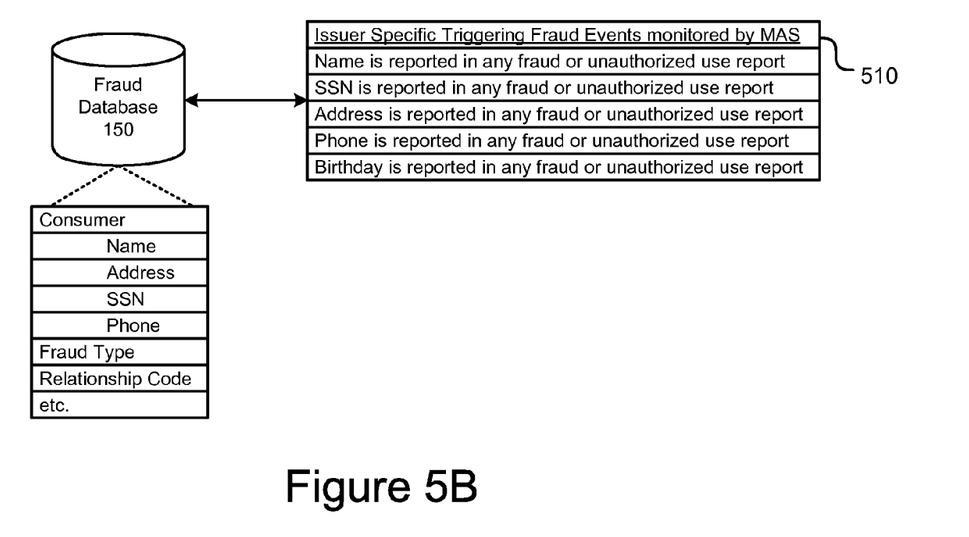

The threshold consumer data element velocity can be suggested by AIS 110 or can be set by individual issuers according to their own risk management protocols. FIGS. 5A and 5B illustrate a number of example threshold velocities or triggering events based on information in application database 146 and fraud database 150. These examples will be discussed in further detail in reference to FIGS. 5A and 5B below.

Alerts

When MAS 160 detects a triggering event at the consumer data element level, it can push an alert in real time to issuers who have elected to receive alerts upon the detection of specific triggering event in step 6. For example, MAS 160 may have detected that a consumer's name has appeared in 10 or more applications in the last 30 days. At this point, MAS 160 can first check if it is presumed that one or more issuers have permissible purpose to receive information regarding the consumer or the consumer data element that triggered the event. Under the Fair Credit Reporting Act (FCRA), issuers are only allowed to receive information for consumers with whom they have an open account. As described above, MAS 160 can presume permissible purpose when AIS 110 has an account application on file and confirmation that an account was opened based on the corresponding application. As can be seen in FIG. 2, MAS 160 has presumed that issuer B 115 and issuer C 125 both have permissible purpose to receive an alert regarding a triggering event.

In some embodiments, MAS 160 can also include alert module 165 that can also report the alert in step 7 to consumer alert module 170. Consumer alert module 170, which may be in the form of hardware, software, or any combination thereof, can then send an alert to consumer A 171 when MAS 160 detects a triggering event with regard to one or more elements of consumer A's consumer data in step 8.

In various embodiments and AIS 110 can also include a processing association database 130 and the consumer scoring module 135. In such embodiments and MAS 160 can monitor both processing association database 130 and consumer scoring module 135 for other consumer data level triggering events such as a dramatic increase in the number of transactions over a given period of time or a sudden change in the consumer credit score.

Figure 3:
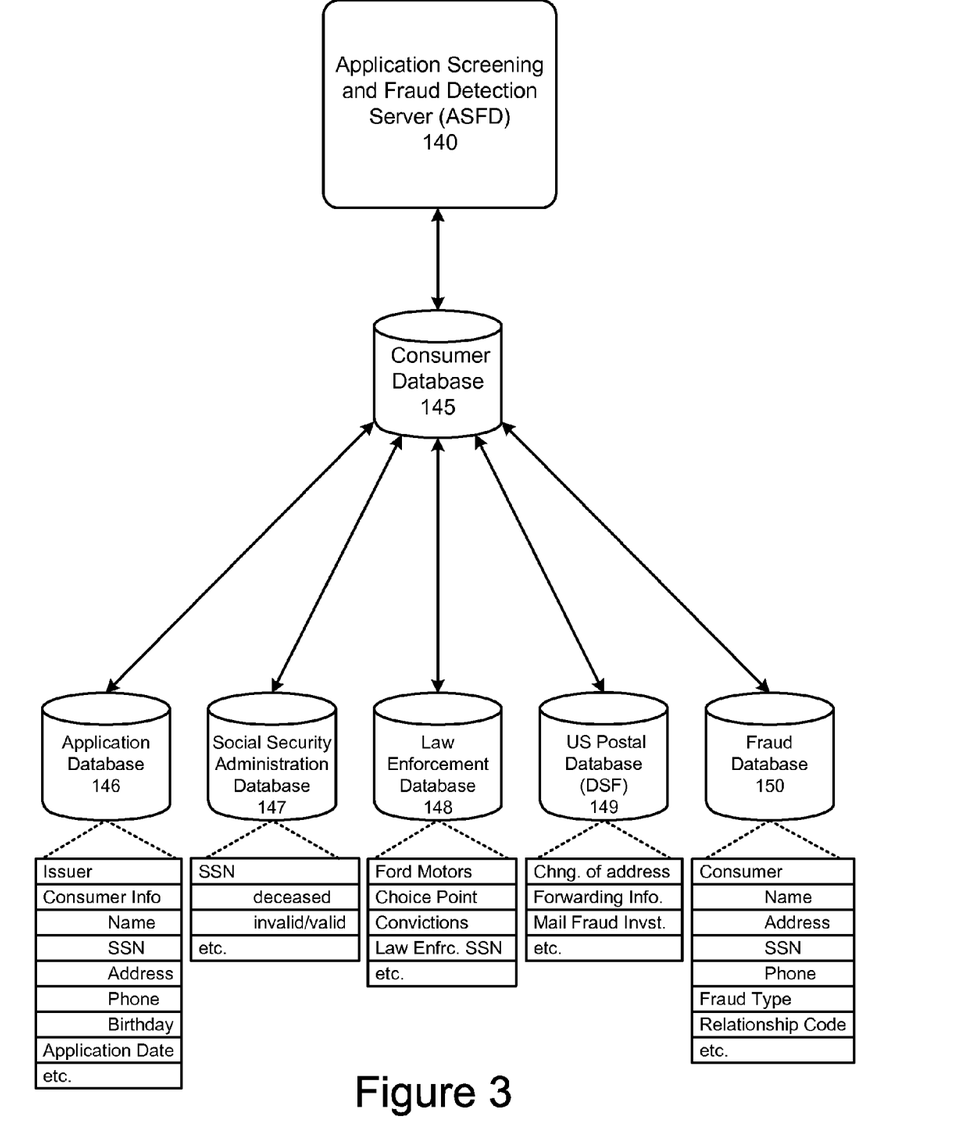
FIG. 3 is a schematic diagram of the consumer database accessed by the application screening and fraud action server according to one embodiment of the present invention.

FIG. 3 illustrates the type of data that can be available to ASFD 140 and, consequently, to MAS 160 in consumer database 145. In some embodiments, consumer database 145 can include application database 146, Social Security administration database 147, law enforcement database 148, US postal database (DSF) and fraud database 150. In some embodiments all the data comprised in the individual databases 146 through 150 can be incorporated into a single consumer database 145, however, based on common practice these databases are maintained individually but the data can be linked with other data records in consumer database 145.

Application database 146 stores information regarding account applications received by AIS 110 or ASFD 140. As indicated, application database 146 can include a record for each account application that contains the name and identifier for the issuer that submitted the account application and any other consumer data or application data included in the account application. Consumer data can include such consumer information as consumer's name, Social Security number, address, phone and birthday. Application data can include an application date and an application identifier. Neither of these lists should be considered exhaustive.

Social Security Administration database 147 contains information regarding the validity and status of Social Security numbers and individuals to whom they are issued. Social Security administration database is updated whenever a Social Security number is issued by the Social Security Administration or when Social Security ministration receives notification that the holder of a Social Security number dies. In some embodiments, Social Security administration database 147 can also store a simple flag as to the validity of a particular social security number to identify quickly fraudulent or fake Social Security numbers.

Law enforcement database 148 can include records reported from law-enforcement agencies or from entities with information that may have been breached or compromised. For example, credit-issuing entities such as car financing companies and retail stores can report information to law-enforcement or to the law-enforcement database 148 directly when they report that consumer information may have been breached. Similarly, courts and investigative law enforcement agencies can report to law enforcement database 148 whenever an individual's information leads to a conviction or is currently under investigation for fraud or other illicit activity.

US postal database 149 is updated voluntarily by consumers as well as by mail carriers reporting information regarding false, missing, out of sequence or nonexistent postal addresses. This information can be used by AIS 110 and ASFD 140 to check the validity of addresses linked to account information and application data.

Fraud database 150 can include reports of consumer fraud at the consumer data element level. Such records can include a listing of consumer data elements such as names, addresses, SSNs and phone numbers that are or are suspected of being used fraudulently. The type of fraud suspected of each piece of consumer data can also be reported. Additionally, it is helpful it report whether the suspected fraud was perpetrated by the actual consumer identified by the consumer data elements or if it appears to or has been proven to be a case of identity theft.

Figure 4:
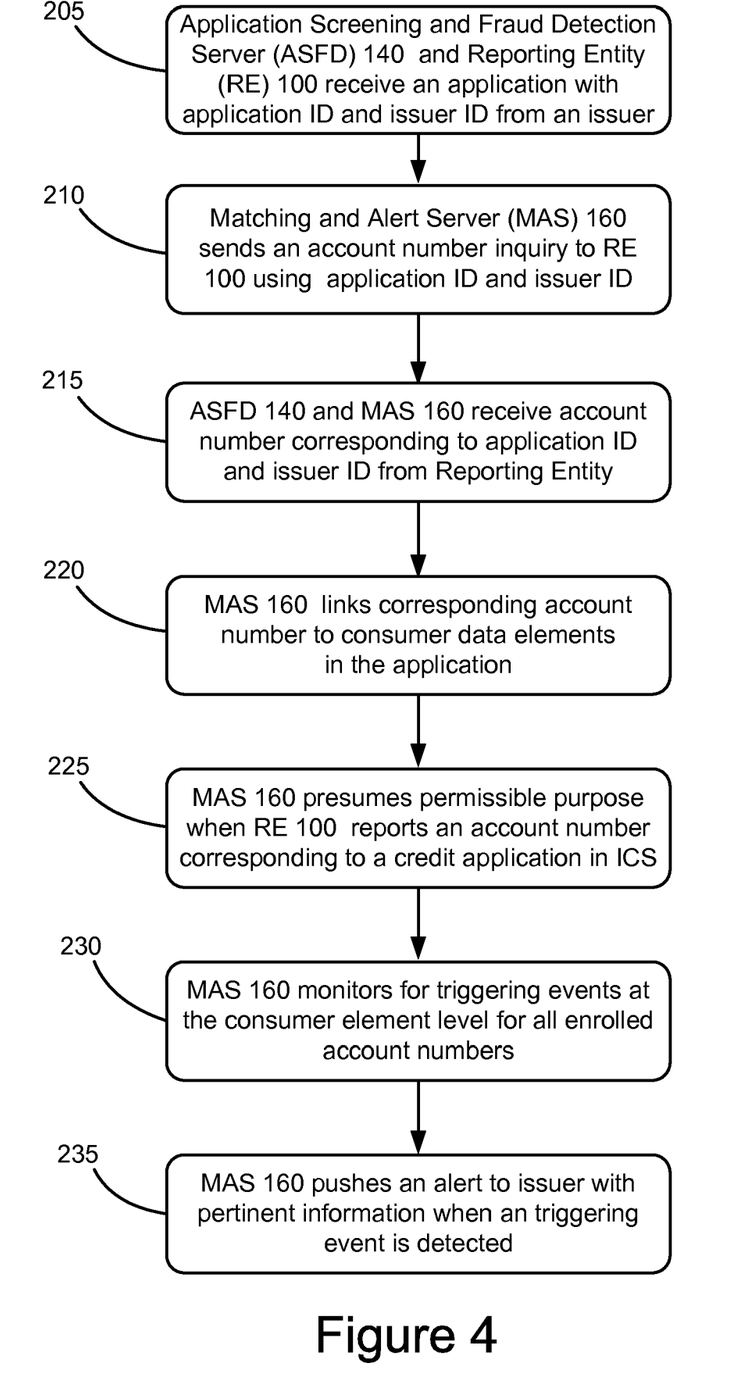
FIG. 4 depicts a flow chart of the overall process of delivering advanced warning alerts to an account issuer according to one embodiment of the present invention.

FIG. 4 depicts a flowchart of a method pushing real-time online advanced warning alerts to account issuers. Although this method can be utilized for providing advanced warning alerts to any kind of account issuer wishing to manage risk and fraud, the steps depicted in FIG. 4 have particular relevance to pushing advanced warning alerts to credit card account issuers.

The method starts at step 205 in which ASFD 140 and a reporting entity each receive an account application from one or more issuers. In some embodiments, ASFD can be an issuers clearinghouse that receives and processes credit card account applications from various credit card issuers and the reporting entity can be any one of multiple credit reporting bureaus.

The account application received by ASFD 140 and the reporting entity 100 can contain an application identifier and issuer identifier along with any pertinent consumer data that can be used to identify the application in later steps. To determine if an account is opened based on an account application received by ASFD 140, MAS 160 or ASFD 140 can send an account number inquiry to an outside reporting entity 100 in step 210. The account number inquiry can include the application identifier and the issuer identifier. In some embodiments, MAS 160 can send a command to ASFD 140 to initiate an account number inquiry. The format and content of such an account number inquiry can vary according to the requirements of MAS 160 and reporting entity 100. Additionally, MAS 160 can send an account number inquiry to more than one reporting entity.

Next, in step 215 ASFD 140 and MAS 160 receive responses from the outside reporting entity 100. In some embodiments, ASFD 140 receives a response, while in other embodiments, MAS 160 receives the response. In either embodiment, it is possible for ASFD 140 and MAS 160 to share the response. The response from the outside reporting entity can indicate that no account has been opened based on the account application information submitted or it can return a response containing an account number associated with the account application identifier and the issuer identifier and other information that may be used to confirm that the account was opened in response to the account application received by ASFD 140. When ASFD 140 and MAS 160 receive an account number that corresponds to a previously submitted account application, MAS 160 links the corresponding account number to consumer data elements contained in a previously submitted account application in step 220. In some embodiments, this can result in multiple database records that link individual consumer database elements to the account number.

Once MAS 160 can verify that an account has been opened and is still open, MAS 160 can presume that various issuers have a permissible purpose under FCRA to receive certain kinds of information regarding consumer data elements and open accounts in step 225.

Step 230 is a recurring step in which MAS 160 monitors for triggering events at the consumer data element level for enrolled account numbers and issuers. Each time a new account application is received by ASFD 140, ASFD 140 can send consumer data to MAS 160 for monitoring of triggering events. In alternative embodiments, MAS 160 will query ASFD 140 for new account application data including consumer data in a periodic fashion. For example, MAS 160 can query ASFD daily, weekly or some other predetermined period of time. In other embodiments, MAS 160 can actively or passively obtain information each time AIS 110 or ASFD 140 performs routine settlement or reconciliation protocols.

In some embodiments, MAS 160 or ASFD can recommend or set the triggering events. In other embodiments, the individual issuers will define the triggering events based on their own risk management and fraud detection protocols. Depending on the definition of the triggering event, the issuer may or may not be entitled to receive full details of the triggering event. For example, if a first issuer has defined a triggering event as the detection of a consumer's name in 5 or more applications within 60 days, and those applications originated at different issuers, the first issuer can only receive alerts stating the consumer's name has been detected in 5 or more applications within 60 days. At that point, it will be up to the issuer to investigate the situation. Further examples of possible triggering events are discussed below in reference to FIG. 5.

Each time MAS 160 detects a triggering event for a particular issuer, MAS 160 pushes an alert to the issuer with pertinent information regarding the triggering event in step 235. MAS 160 can push alerts to issuers over existing telecommunication networks including, but not limited to, proprietary transaction and processing networks, the Internet, wireless networks, e-mail, etc.

Content and Format of Advanced Alerts

Issuers can choose to receive unformatted advanced alerts. Alternatively, issuer can elect to receive formatted advanced alerts that comply with their in-house processor system formats. The practical, day-to-day application of advanced alert content can depend on the issuers' application processing system and procedures. In some embodiments, issuers may be instructed to approve any application that does not exceed their criteria for review and investigation, even if advanced warning alerts have been generated. In other embodiments, the contents of advanced alerts can be used more as general guidelines to help issuers determine which alerts to investigate. In various embodiments, the content and format of an advanced warning alert can be customized to the needs of each individual issuer. Alternatively, an unformatted standardized alert can be delivered to issuers with documentation indicating the methodology and nomenclature used to delineate the data contained in the answer. In such embodiments, it is left to the issuers to parse the data received in the advanced warning alert into their risk management and fraud detection applications and routines.

Depending on the content of the advanced warning alert sent by MAS 160, the issuer may want to take appropriate action. For example, issuers may choose to issue a hard turn down, soft turn down, queue the application for analyst review or continue to process the application.

Triggering Events

FIGS. 5A and 5B illustrate examples of definitions for triggering events according to various embodiments of the present invention. FIG. 5A lists a number of triggering events that can be defined using consumer data element information stored in application database 146. In such embodiments, MAS 160 can be configured to monitor information incoming to and stored in application database 146 for issuer specific application data triggering events 500. Application data can include consumer data elements.

The triggering events listed in table 500 are examples of the types of application data triggering events possible with data stored in the application database 146 and should not be viewed as limiting the types of triggering events that can be defined based on consumer level data or other data stored in the application database 146. The basis of most of the sample triggering events depicted in FIG. 5A is the observation of a data element velocity. For example, one triggering event may be defined as the detection of a consumer's name in $N_n$ applications within the last $M_n$ days. As shown in the FIG. 5A, MAS 160 can also monitor and detect similar velocities for Social Security numbers (SSN), address, phone number, birth date and number of applications listing a given application date. Each of the variables depicted in FIG. 5A can be set by either the issuer itself, MAS 160, ASFD 140 or a composite system such as AIS 110. In various embodiments, a triggering event may be defined as the simultaneous, concurrent or cumulative occurrence of two or more of the triggering events depicted in table 500. For example, in issuer may wish to be alerted if a SSN is detected on six or more applications within a six-month period but only if the corresponding address is detected in less than six applications within the same six-month period.

Using data element velocity as a triggering event is advantageous, because repeated patterns of fraudulent activity are often expressed by specific data element velocities. Various aspects of the present invention that facilitate the observation of specific data element velocities are the application and consumer data and the links created between account identifiers (account numbers) and individual consumer data elements stored in the consumer database 145. Consumer database 145 can stored any or all of the application and consumer data it receives in applications submitted by issuers for any length of time. In some embodiments, consumer database 145 can store data indefinitely. In other embodiments, data in consumer database 145 can be stored for a limited period of time. The period of time the data is stored can be dictated by data storage capacity limitations or government rules and regulations.

For whatever time period the data is stored in consumer database 145, is the time period maximum for which a threshold data element velocity can be defined. For example, if the consumer data is stored for two years before being purged, then a threshold data element velocity can be defined over a time period of two years. For instance, the threshold consumer name velocity can be defined as the consumer name being observed in $N_n$ applications in a two-year period.

As previously stated the threshold data element velocities can be defined by issuers according to their individual internal risk management tools and protocols. Additionally, the threshold data element velocity can be redefined by the issuers any number of times after the threshold data element velocities are initially defined. Issuers can be allowed to change the threshold data element velocity at anytime they require. Alternatively, issuer-initiated changes to threshold data element velocities can be limited to certain enrollment periods to save costs and resources. Considerations of limiting cost and resources can be dictated by specific business and technical arrangements. Similarly, threshold data element velocities defined by entities other than the issuers, such as AIS 110, can also be changed as business concerns or understandings of fraudulent schemes develop.

New techniques and methods of using consumer data elements for fraudulent purposes are continuously emerging. The ability of the present invention to redefine threshold data element velocities and combine multiple threshold data element velocities with multiple fraud alerts into composite triggering events makes it possible for embodiments of the present invention to adapt to emerging fraudulent schemes. Additionally, by allowing issuers to set the threshold data element velocities as the triggering events and providing real time data element velocities status updates, the present invention can provide customizable and flexible risk management tools that issuers can use to anticipate, predict and obviate potential future risks and fraud. Issuers can individually undertake the responsibility of monitoring new risks and adjusting their threshold data element velocities, or they can subscribe to a service provided by AIS 110 for recommendations as to how threshold data element velocities can be defined and redefined in light of emerging fraud risks monitored by the AIS 110.

FIG. 5B illustrates a table 510 of some issuer specific fraud triggering events based on data contained in fraud database 150 that can be monitored by MAS 160 according to various embodiments of the present invention. Fraud database 150 can be accessible by ASFD 140 according to one embodiment of the present invention. As shown, fraud database 150 can contain different types of fraud data reported by various entities including external reporting entities and issuers. Fraud database 150 can contain consumer level fraud information. Any time an issuer, law enforcement agency, credit reporting entity or other entity reports that a consumer data element, such as, consumer name, address, SSN, phone number or other specific consumer level detail has been involved in fraudulent behavior, that consumer data element can show up in fraud database 150. Additionally, when a consumer data element is reported as being involved with fraudulent activity, the fraud type and relationship code can also be reported to and recorded in fraud database 150. Relationship codes can reveal whether not the actual consumer identified by the name, address, SSN or phone number was involved with the behavior or whether that person was the victim of identity theft.

As shown in table 510, MAS 160 can monitor fraud database 150 via AFSD 140 or through a direct connection with the fraud database 150 to detect when consumer data element level fraud or unauthorized use has been reported. Additionally, MAS 160 can be required to detect a combination of application data triggering events and reported fraud triggering events before sending an alert. For example, MAS 160 can send an alert to an issuer if it detects that an address has been detected 10 times on 10 different applications within the last 120 days in the application database 145 and the address has been reported in an authorized use report. At this point, MAS 160 can push an alert to any issuer determined to have permissible purpose under FCRA based on the existence of an open account resulting from an application previously submitted to ASFD 140.

In some embodiments, MAS 160 is essentially a collection of databases about SSNs, addresses, and telephone numbers, and their relationship to account applications and fraudulent or suspicious conditions. MAS 160 can connect issuers with information from many sources. Such information can identify applications that contain invalid or questionable SSN numbers, uncover consumers loading up on credit or other accounts, indicate an address possibly being used as a maildrop, uncover fraudulent account and application activity, disclose SSNs associated with a bankruptcy filing or those that have been compromised or indicate when there is other suspicious behavior that may warrant further investigation. ASFD 140 can have access to consumer database 145 which maintains and continuously updates information regarding consumer data on a consumer data element level reported by other issuers and other third parties.

The alert at MAS 160 pushes to an issuer can contain various pieces of helpful information. Depending on the level of permissible purpose an issuer has, the alert can comprise a status or count of all other possible consumer data element velocities or other consumer data elements triggering events. Such status reports included in the alert can indicate how close a particular consumer data element is from reaching its threshold. For example, a threshold consumer name velocity can be defined as the consumer name appearing in seven applications in the last 120 days. The status report can then include in the alert an indication that the consumer name has appeared five times in the last 100 days and that the consumer name threshold velocity is close to being triggered.

In another embodiment, the alert can include a detailed description of the triggering events or threshold velocities that triggered the alert. The level of detail delivered to an issuer, of course, will depend on the level of permissible purpose that AIS 110 determines that particular issuer has. For example, the alert can include a description of the fraud report from fraud database 150 that was reported by another issuer who discovered some or all of a particular consumer's consumer data has been compromised and used in fraudulent activity.

Figure 6:
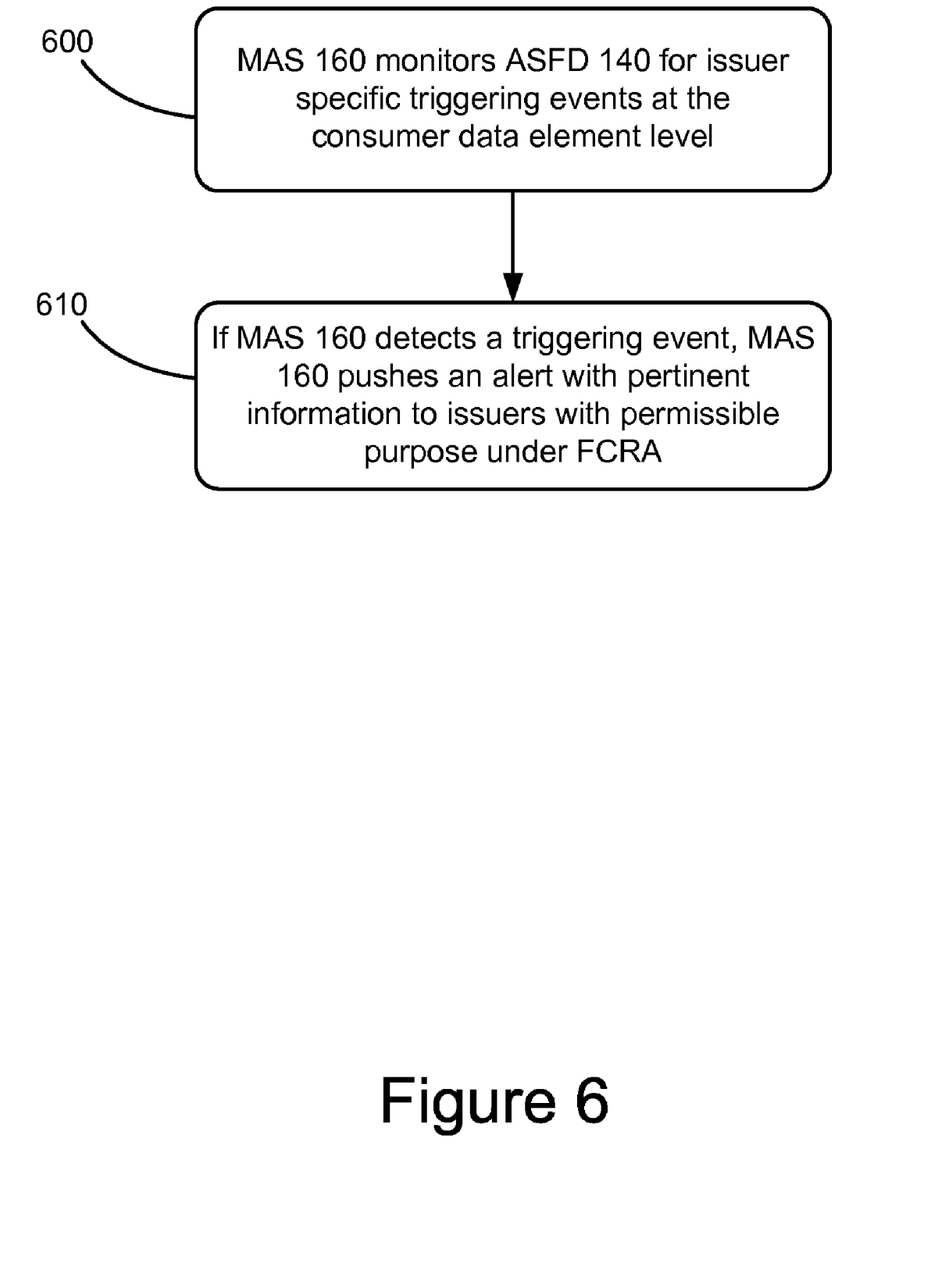
FIG. 6 depicts a flow chart of the one transaction process of pushing an advanced warning alert to an issuer with predetermined permissible purpose according to one embodiment of the present invention.

FIG. 6 illustrates a simplified flowchart of a method of pushing advance alerts to an issuer from the perspective of MAS 160 according to one embodiment of the present invention. As shown in FIG. 6, getting information from MAS 160 to an issuer requires only one transaction in step 610. In step 600, MAS 160 monitors ASFD 140 and consumer database 145 for issuer specific triggering events at the consumer data element level. In various embodiments, step 600 is performed continuously or at various intervals defined by AIS 110 or an issuer. MAS 160 can process each application as it is received by AIS 110 or AIS 110 can save batches of applications and MAS 160 can process them in batches. When MAS 160 detects one of the issuer specific triggering events, MAS 160 can push an alert with all allowable pertinent information to an issuer automatically. No action is required of the issuer for the alert to be pushed. MAS 160 can be configured to monitor ASFD 140 and consumer database 145 on continuous loop or it can be configured to run an inquiry to detect triggering events on a periodic basis. For example, MAS 160 can be configured to run every 24 hours or MAS 160 can be configured to run an inquiry each time ASFD 140 reconciles the data stored in consumer database 145.

Figure 7:
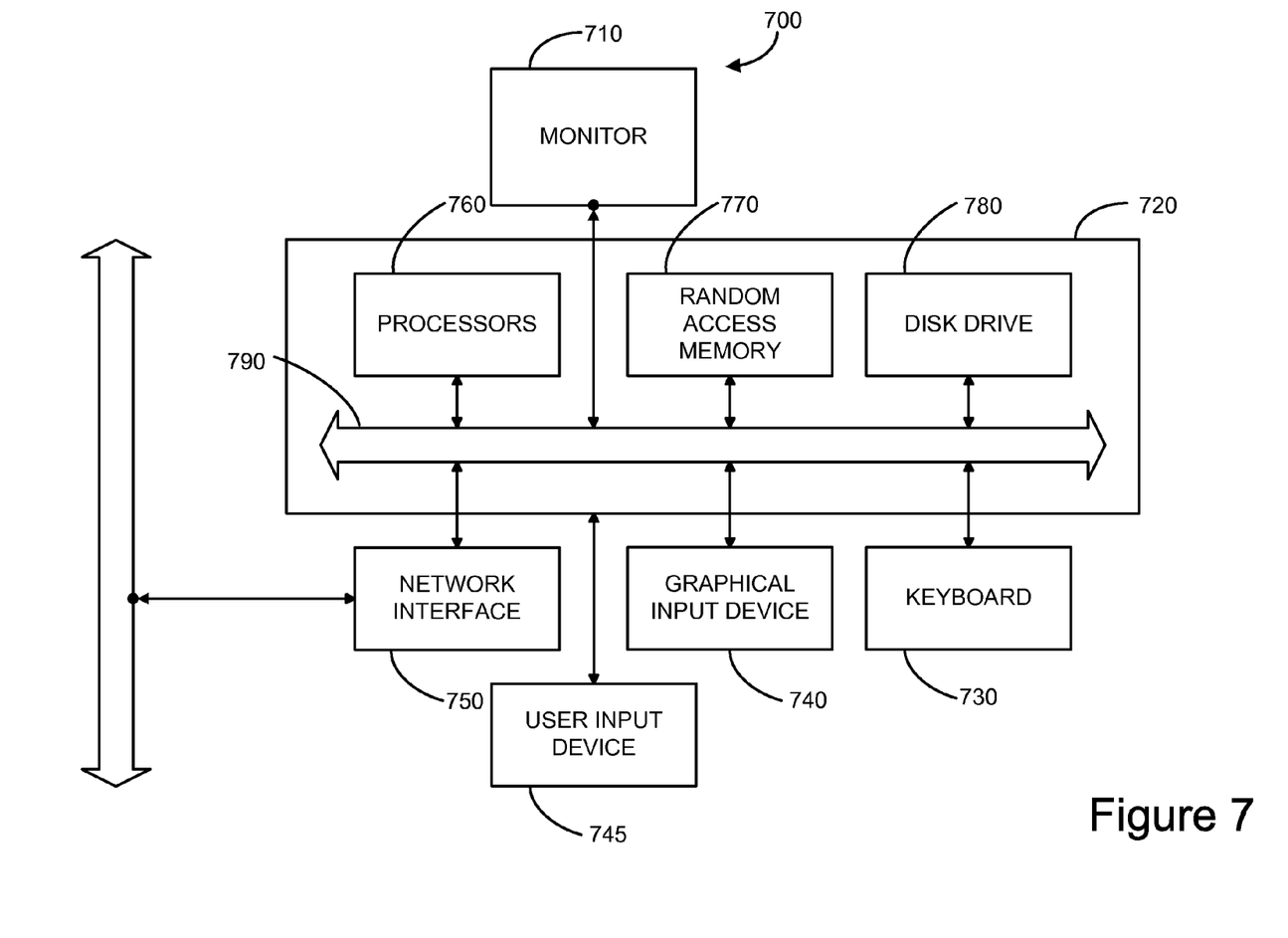
FIG. 7 depicts a schematic diagram of a computer system with which embodiments of the present invention can be practiced.

FIG. 7 is a block diagram of typical computer system 700 configured to execute computer readable code to implement various functions and steps according to various embodiments of the present invention.

FIG. 7 is representative of a computer system capable of embodying the present invention. The computer system can be present in any of the elements in FIG. 2, including the AIS 110 described above. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

In one embodiment, computer system 700 typically includes a display 710, computer 720, a keyboard 730, a user input device 740, computer interfaces 750, and the like. In various embodiments, display (monitor) 710 may be embodied as a CRT display, an LCD display, a plasma display, a direct-projection or rear-projection DLP, a microdisplay, or the like. In various embodiments, display 710 may be used to display user interfaces and rendered images.

In various embodiments, user input device 740 is typically embodied as a computer mouse, a trackball, a track pad, a joystick, wireless remote, drawing tablet, voice command system, eye tracking system, and the like. User input device 740 typically allows a user to select objects, icons, text and the like that appear on the display 710 via a command such as a click of a button or the like. An additional specialized user input device 745 may also be provided in various embodiments. User input device 745 may include a number of image capturing devices or image capturing systems as described above. In some embodiments, user input device can be an electronic measuring device such and a laser or sonic based measuring system to determine the relative distances between components of the systems described herein. In other embodiments, user input device 745 include additional computer system displays (e.g. multiple monitors). Further user input device 745 may be implemented as one or more graphical user interfaces on such a display.

Embodiments of computer interfaces 750 typically include an Ethernet card, a modem (telephone, satellite, cable, ISDN), (asynchronous) digital subscriber line (DSL) unit, FireWire interface, USB interface, and the like. For example, computer interfaces 750 may be coupled to a computer network, to a FireWire bus, or the like. In other embodiments, computer interfaces 750 may be physically integrated on the motherboard of computer 720, may be a software program, such as soft DSL, or the like.

RAM 770 and disk drive 780 are examples of computer-readable tangible media configured to store data such as captured and rendered image files, ordered geometric descriptions of objects, procedural descriptions of models, scene descriptor files, a rendering engine, embodiments of the present invention, including executable computer code, human readable code, or the like. Other types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

In the present embodiment, computer system 700 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, a graphical processor unit, GPU, may be used to accelerate various operations, described below. Such operations may include color grading, automatically performing a gamut remapping, or the like.

In various embodiments, computer 720 typically includes familiar computer components such as a processor 760, and memory storage devices, such as a random access memory (RAM) 770, disk drives 780, and system bus 790 interconnecting the above components.

In some embodiments, computer 720 includes one or more Xeon microprocessors from Intel. Further, in the present embodiment, computer 720 typically includes a UNIX-based operating system.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method, performed by an advance identification system (AIS) comprising at least one processor implementing an application screening and fraud detection server (AFSD) communicatively coupled to a matching and alert server (MAS), for pushing advance warning alerts to a requesting entity requesting information related to an account application to open a new account with an issuer, the method comprising:

receiving, at the AFSD, the account application to open the new account with the issuer, wherein the account application includes: a plurality of consumer data elements for identifying the applicant of the account application, an account application identifier for identifying the application, and a requesting entity identifier for identifying the requesting entity that is requesting information related to the account application;

sending, from the AFSD to one or more reporting entities, a query to determine if the new account corresponding to the account application was opened, wherein the query comprises the account application identifier of the account application and an issuer identifier identifying the issuer;

receiving, at the AIS, a response to the query from the one or more reporting entities, wherein the response to the query comprises an account identifier of the new account corresponding to the account application to indicate that the new account was opened;

in response to receiving the account identifier indicating that the new account was opened, linking in one or more database records of one or more databases, the account identifier provided in the response, to the plurality of consumer data elements from the account application;

monitoring, by the AIS, subsequent account applications for triggering events for triggering alerts, wherein the triggering events comprises fraud data reported from one or more sources relating to one or more of the plurality of consumer data elements, or a threshold consumer data element velocity indicating the number of times a particular consumer data element is received in the subsequent applications within a time period; and pushing, from the AIS to the requesting entity, an alert message when the triggering events are detected, wherein the requesting entity is identified, by the AIS, using the account identifier that is linked to the plurality of consumer data elements in the one or more databases.

2. The method of claim 1, wherein the requesting entity is the issuer of the new account.

3. The method of claim 1, wherein the subsequent account applications comprise account applications from a plurality of issuers.

4. The method of claim 1, wherein the alert message is pushed to the requesting entity when two or more triggering events are detected concurrently.

5. An advance identification system (AIS) for pushing advance warning alerts to a requesting entity requesting information related to an account application to open an account with an issuer, the advance identification system comprising:

at least one processor; and one or more memory storage devices coupled to the at least one processor, the one or more memory storage devices storing:

a consumer database; and computer executable code, which when executed by the at least one processor causes the at least one processor to:

send, to one or more reporting entities, a query to determine if the account with the issuer was opened in response to the account application to open the account, wherein the account application comprises a plurality of consumer data elements for identifying the applicant of the account application, an account application identifier for identifying the account application, and a requesting entity for identifying the requesting entity, and wherein the query comprises the account application identifier and an issuer identifier for identifying the issuer;

receive a response to the query from the one or more reporting entities, wherein the response comprises an account identifier of the account corresponding to the account application to indicate that the account was opened;

link, in one or more database records in the consumer database, the account identifier received from the one or more reporting entities, to the plurality of consumer data elements from the account application;

monitor subsequent account applications for triggering events for triggering alerts, wherein the triggering events comprises fraud data reported from one or more sources relating to one or more of the plurality of consumer data elements, or a threshold consumer data element velocity indicating the number of times a particular consumer data element is received in the subsequent applications within a time period; and push, to the requesting entity, an alert message when the triggering events are detected, wherein the requesting entity is identified using the account identifier that is linked with the plurality of consumer data elements in the consumer database.

6. The system of claim 5, wherein the requesting entity is the issuer of the new account.

7. The system of claim 5, wherein the subsequent account applications comprise account applications from a plurality of issuers.

8. The system of claim 5, wherein the alert message is pushed to the requesting entity when two or more triggering events are detected concurrently.

* * * * *